United States Patent
Sun et al.

(10) Patent No.: US 11,277,233 B2
(45) Date of Patent: Mar. 15, 2022

(54) METHOD FOR STARTING REFLECTIVE MAPPING, COMMUNICATION DEVICE, AND STORAGE MEDIUM

(71) Applicants: China Mobile Communication Co., Ltd Research Institute, Beijing (CN); China Mobile Communications Group Co., Ltd., Beijing (CN)

(72) Inventors: Junshuai Sun, Beijing (CN); Yingying Wang, Beijing (CN); Xueyan Huang, Beijing (CN); Zhuo Chen, Beijing (CN); Xingyu Han, Beijing (CN); Chihlin I, Beijing (CN)

(73) Assignees: China Mobile Communication Co., Ltd., Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 82 days.

(21) Appl. No.: 16/636,189

(22) PCT Filed: Aug. 2, 2018

(86) PCT No.: PCT/CN2018/098267
§ 371 (c)(1),
(2) Date: Feb. 3, 2020

(87) PCT Pub. No.: WO2019/024888
PCT Pub. Date: Feb. 7, 2019

(65) Prior Publication Data
US 2020/0177327 A1    Jun. 4, 2020
US 2021/0135799 A9    May 6, 2021

(30) Foreign Application Priority Data
Aug. 4, 2017   (CN) .......................... 201710661763.4

(51) Int. Cl.
  *H04L 1/18*    (2006.01)
  *H04W 76/10*   (2018.01)
  *H04W 28/02*   (2009.01)

(52) U.S. Cl.
  CPC ....... *H04L 1/1893* (2013.01); *H04W 28/0263* (2013.01); *H04W 76/10* (2018.02)

(58) Field of Classification Search
  CPC ... H04L 1/1893; H04L 1/1887; H04L 5/0055; H04W 28/0263; H04W 76/10; H04W 36/165
  See application file for complete search history.

(56) References Cited

U.S. PATENT DOCUMENTS

2010/0214973 A1*  8/2010  Lim ...................... H04W 76/10
                                                370/315
2018/0317120 A1* 11/2018  Wang ................ H04W 28/0263
(Continued)

OTHER PUBLICATIONS

Convida Wirless: "SDAP Header Format", 3GPP Draft; R2-1707351 (SDAP Header Format), 3rd Generation Partnership Project (3GPP), Mobile Competence Centre; 650, Route Des Lucioles; F-06921 Sophia-Antipolis Cedex France.
(Continued)

*Primary Examiner* — Melanie Jagannathan
(74) *Attorney, Agent, or Firm* — Price Heneveld LLP (57) ABSTRACT

The present disclosure provides a method for starting reflective mapping, a communication device and a storage medium. The method for starting reflective mapping applied to a first communication device, includes: when determining that first data packet is to be transmitted by first underlying bearer, adding a startup identifier of a first value to a second data packet, where the startup identifier of the first value is used to instruct a second communication device to start reflective mapping, the first data packet is a data packet transmitted by the second communication device to the first
(Continued)

communication device, and the second data packet is a data packet that is originally to be transmitted by the first communication device; and transmitting the second data packet carrying the startup identifier of the first value by the first underlying bearer.

12 Claims, 5 Drawing Sheets

(56) References Cited

U.S. PATENT DOCUMENTS

| | | | | |
|---|---|---|---|---|
| 2018/0324631 | A1* | 11/2018 | Jheng | H04L 1/1887 |
| 2019/0075482 | A1* | 3/2019 | Eriksson | H04W 76/27 |
| 2019/0349803 | A1* | 11/2019 | Byun | H04W 28/16 |
| 2020/0008118 | A1* | 1/2020 | Han | H04W 76/11 |
| 2020/0100136 | A1* | 3/2020 | Chang | H04W 28/24 |
| 2020/0112873 | A1* | 4/2020 | Zhu | H04W 76/27 |
| 2020/0169912 | A1* | 5/2020 | Chang | H04W 76/19 |
| 2020/0169913 | A1* | 5/2020 | Byun | H04W 80/08 |
| 2020/0275302 | A1* | 8/2020 | Youn | H04W 28/0268 |

OTHER PUBLICATIONS

Intel Corproation "As Reflective Mapping and Precedence Handling", 3GPP Draft; R2-1707035-QRI-Remapping_V2, 3rd Generation Partnership Project (3GPP), Mobile Competence Centre; 650, Route Des Lucioles; F-06921 Sophia-Antipolis Cedex; France.

3GPP: 3rd Generation Partnerhship Project; Technical Specification Group Radio Access Network; NG Radio Access Network; Overall Description; stage 2 (Release 15), 3GPP TS 38.300 Vo.2.0, May 1, 2017, pp. 1-33.

* cited by examiner

METHOD FOR STARTING REFLECTIVE MAPPING, COMMUNICATION DEVICE, AND STORAGE MEDIUM

CROSS-REFERENCE TO RELATED APPLICATION

This application is the U.S. national phase of PCT Application PCT/CN2018/098267 filed on Aug. 2, 2018, which claims the benefit and priority of Chinese Application No. 201710661763.4, filed on Aug. 4, 2017, the disclosures of which are incorporated in their entirety by reference herein.

TECHNICAL FIELD

The present disclosure relates to the field of wireless technologies, and in particular to a method for starting a reflective mapping, a communication device, and a storage medium.

BACKGROUND

The concept of Reflective Mapping is introduced in the Service Data Adaptation Protocol (SDAP). For data transmission based on reflective mapping, if a transmitting end transmits data to a receiving end at an i-th layer, after the receiving end receives the data, the receiving end will return data to the transmitting end at the i-th layer based on the transmission mechanism of the reflective mapping.

However, in the related art, only the concept of reflective mapping is given, but the specific implementation method of how to initiate or use the reflective mapping in the specific interaction between the two communication terminals has not been proposed yet. Therefore, how to combine the initiation of the reflective mapping into a specific application scenario or how to combine the initiation of the reflective mapping to the application scenario with small signaling overhead is a problem to be solved in the related art.

SUMMARY

In view of this, embodiments of the present disclosure are intended to provide a method for starting a reflective mapping, a communication device, and a storage medium, which can at least partially solve the above problems.

In order to achieve the above object, technical solutions of the present disclosure are as follows.

According to a first aspect, an embodiment of the present disclosure provides a method for starting a reflective mapping, applied to a first communication device, including: when determining that first data packet is to be transmitted by first underlying bearer, adding a startup identifier of a first value to a second data packet; wherein the startup identifier of the first value is used to instruct a second communication device to start reflective mapping, the first data packet is a data packet transmitted by the second communication device to the first communication device, and the second data packet is a data packet that is originally to be transmitted by the first communication device; and, transmitting the second data packet carrying the startup identifier of the first value by the first underlying bearer.

Optionally, the method further includes: after transmitting the second data packet by the first underlying bearer and receiving the first data packet through the first underlying bearer, adding the startup identifier of a second value into a to-be-transmitted second data packet; transmitting the second data packet carrying the startup identifier of the second value by the first underlying bearer; or, after transmitting the second data packet by the first underlying bearer and receiving the first data packet through the first underlying bearer, transmit the second data packet not carrying the startup identifier.

Optionally, the method further includes: after transmitting the second data packet by the first underlying bearer and before receiving the first data packet through the first low layer bearer, continuing to transmit the second data packet carrying the startup identifier of the first value through the first underlying bearer.

Optionally, the method further includes: when determining that the first data packet is to be transmitted by the first underlying bearer, adding in the second data packet, identification information of the first data packet that is to be transmitted by the first underlying bearer; wherein the identification information is used by the second communication terminal to determine a data packet for performing reflective mapping transmission.

Optionally, when determining that first data packet is to be transmitted by first underlying bearer, adding a startup identifier of a first value to a second data packet, includes: carrying the startup identifier of the first value in a packet header of the second data packet.

Optionally, the method further includes: determining whether quality of service (QoS) attribute of the first data packet changes; wherein the first underlying bearer is an underlying bearer having a target QoS attribute after the QoS attribute of the first data packet changes.

Optionally, the method further includes: determining whether the first underlying bearer is established; when the first underlying bearer is not established and the first communication device is a base station, instructing establishment of the first underlying bearer by RRC signaling, RLC signaling, or MAC signaling; or, when the first underlying bearer is not established and the first communication device is a terminal, requesting for establishing the first underlying bearer by uplink control information.

Optionally, transmitting the second data packet carrying the startup identifier of the first value by the first underlying bearer, includes: switching the second data packet which is originally determined to be transmitted by the second underlying bearer to be transmitted by the first underlying bearer.

According to a second aspect, an embodiment of the present disclosure provides a method for starting a reflective mapping, applied to a second communication device, including: receiving a second data packet carrying a startup identifier transmitted by a first communication device by a first underlying bearer; and, when the startup identifier is of a first value, starting the reflective mapping to transmit a first data packet to the first communication device by the first underlying bearer.

Optionally, the method further includes: the first data packet further carries identification information; when the startup identifier is of a first value, starting the reflective mapping to transmit a first data packet to the first communication device by the first underlying bearer, includes: starting the reflective mapping to transmit the first data packet corresponding to the identification information by the first underlying bearer.

Optionally, when the startup identifier is of a first value, starting the reflective mapping to transmit a first data packet to the first communication device by the first underlying bearer, includes: switching the first data packet which is originally determined to be transmitted by a third underlying bearer to be transmitted by the first underlying bearer.

According to a third aspect, an embodiment of the present disclosure provides a communication device, which is a first communication device, including: an adding unit used to, when determining that first data packet is to be transmitted by a first underlying bearer, add a startup identifier of a first value to a second data packet; wherein the startup identifier of the first value is used to instruct the second communication device to start reflective mapping, the first data packet is a data packet transmitted by a second communication device to the first communication device, and the second data packet is a data packet that is originally to be transmitted by the first communication device; a first transmission unit used to transmit the second data packet carrying the startup identifier of the first value by the first underlying bearer.

According to a fourth aspect, an embodiment of the present disclosure provides a communication device, which is a second communication device, including: a receiving unit used to receive a second data packet carrying a startup identifier transmitted by a first communication device by a first underlying bearer; a second transmission unit used to, when the startup identifier is of a first value, start the reflective mapping to transmit a first data packet to the first communication device by the first underlying bearer.

According to a fifth aspect, an embodiment of the present disclosure provides a communication device, which is a first communication device, including: a first transceiver, a first memory and a first processor. The first processor is coupled to the first transceiver and the first memory, respectively, and is used to execute a computer program to perform at least the following steps: when determining that first data packet is to be transmitted by a first underlying bearer, adding a startup identifier of a first value to a second data packet; wherein the startup identifier of the first value is used to instruct the second communication device to start reflective mapping, the first data packet is a data packet transmitted by a second communication device to the first communication device, and the second data packet is a data packet that is originally to be transmitted by the first communication device; transmitting the second data packet carrying the startup identifier of the first value by the first underlying bearer.

Optionally, the first processor is further used to perform steps including: after transmitting the second data packet by the first underlying bearer and receiving the first data packet through the first underlying bearer, adding the startup identifier of a second value into a to-be-transmitted second data packet; transmitting the second data packet carrying the startup identifier of the second value by the first underlying bearer; or, after transmitting the second data packet by the first underlying bearer and receiving the first data packet through the first underlying bearer, transmit the second data packet not carrying the startup identifier.

Optionally, the first processor is further used to perform steps including: after transmitting the second data packet by the first underlying bearer and before receiving the first data packet through the first low layer bearer, continuing to transmit the second data packet carrying the startup identifier of the first value through the first underlying bearer.

Optionally, the first processor is further used to perform steps including: when determining that the first data packet is to be transmitted by the first underlying bearer, adding in the second data packet, identification information of the first data packet that is to be transmitted by the first underlying bearer; wherein the identification information is used by the second communication terminal to determine a data packet for performing reflective mapping transmission.

According to a sixth aspect, an embodiment of the present disclosure provides a communication device, which is a second communication device, including: a second transceiver, a second memory and a second processor. The second processor is coupled to the second transceiver and the second memory, respectively, and is used to execute a computer program to perform at least the following steps: receiving a second data packet carrying a startup identifier transmitted by a first communication device by a first underlying bearer; and when the startup identifier is of a first value, starting the reflective mapping to transmit a first data packet to the first communication device by the first underlying bearer.

Optionally, the first data packet further carries identification information; the second processor is further used to perform steps including: when the startup identifier is of a first value, starting the reflective mapping to transmit the first data packet corresponding to the identification information by the first underlying bearer.

According to a seventh aspect, an embodiment of the present disclosure provides a communication device, including: a third transceiver, a third memory, a third processor, and a computer program stored on the third memory and processed by the third processor. The third processor is respectively coupled to the third transceiver and the third memory, and is used to execute the computer program to control the transceiver to exchange information, control the third memory to store information, perform the method for starting a reflective mapping applied to the first communication device or the second communication device.

According to an eighth aspect, an embodiment of the present disclosure provides a computer storage medium including a computer program stored thereon. The computer program is executed by a processor to perform the method for starting a reflective mapping applied to the first communication device or the second communication device.

According to the method for starting a reflective mapping, the communication device and the storage medium provided in the embodiments of the present disclosure, when the first communication device triggers the second communication device to start reflective mapping, the first communication device uses the second data packet, which is originally to be transmitted to the second communication device, to carry the startup identifier for triggering startup of the reflective mapping, and transmits the second data packet carrying the startup identifier of the first value by the first underlying bearer for performing the reflective mapping. In this way, after the second communication device receives the second data packet carrying the startup identifier of the first value transmitted by the first underlying bearer, the second communication device starts the reflective mapping to transmit the first data packet by the first underlying bearer. First, the solution provided in the application provides a specific implementation scheme I which the first communication device triggers the second communication device to start the reflective mapping. Further, the solution provided in the application uses the second data packet, which is originally to be transmitted to the second communication device, to carry the startup identifier of the first value, then there is no need for constructing a special data packet for transmission of the startup identifier of the first value, thereby having the characteristics of low overhead and easy to implement.

DETAILED DESCRIPTION

Technical solutions of the present disclosure will be further described in details hereinafter in conjunction with the drawings and specific embodiments.

The reflective mapping provided in embodiments of the present disclosure is defined in the SDAP protocol. The SDAP protocol is layered on two communicating communication devices, and may specifically include: a physical (PHY) layer, a media access control (MAC) layer, a radio link control (RLC) layer on a layer above the MAC layer, a Packet Data Convergence Protocol (PDCP) layer on the RLC layer and a new Access Stratum (AS) sublayer on the PDCP. The new AS sublayer herein is also known as the SDAP layer. The SDAP layer is used to map data to an underlying bearer of the SDAP layer, and mark a flow identifier corresponding to the data. A functional entity located at the SDAP layer here is called an SDAP entity. The underlying bearer of the SDAP layer includes: a bearer for communication between two communication parties using functional layers below the peer SDAP layer. In this embodiment, the PHY layer is an L1 layer; the MAC layer, the RLC layer and the PDCP layer are L2 layers. Underlying layers of the SDAP may include the L2 layer and the L1 layer. Therefore, the underlying bearer of the SDAP in this embodiment may include one or more of all the bearers of the L1 layer and the L2 layer. For example, the underlying bearer of the SDAP includes: a radio access bearer. The radio access bearer may be divided into data radio access bearer (DRB) and signaling radio access bearer (SRB) based on data and signaling. The underlying bearer of the SDAP may further include at least one of a logical channel, a transmission channel, and a physical channel.

Figure 1:
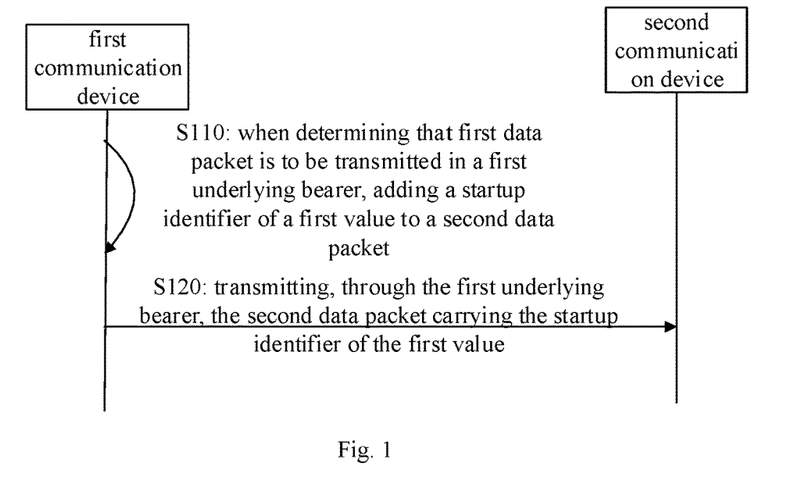
FIG. 1 is a schematic flowchart of a method for starting a reflective mapping according to a first embodiment of the present disclosure.

As shown in FIG. 1, an embodiment provides a method for starting a reflective mapping based on an associated data packet, which may be applied to a first communication device, including:

Step S110: when it is determined that first data packet needs to be transmitted in a first data radio bearer underlying bearer, adding a startup identifier of a first value to a second data packet; where the first data packet is a data packet transmitted by a second communication device to the first communication device, the startup identifier of the first value is used to instruct the second communication device to start reflective mapping, and the second data packet is a data packet that needs to be transmitted to the second communication device;

Step S120: transmitting, through the first underlying bearer, the second data packet carrying the startup identifier of the first value.

The reflective mapping provided in this embodiment is a data transmission mechanism specified by the SDAP, and may be used for transmission of uplink and downlink data between a base station and a terminal.

In this embodiment, when the first communication device is a base station, the second communication device may be a terminal; when the second communication device is a base station, the first communication device is a terminal. In summary, the present embodiment provides a method of starting a reflective mapping applied to the first communication device.

In the step S110, when it is determined that the first data packet transmitted by the second communication device to the first communication device needs to be transmitted at the first underlying bearer, in order to instruct the second communication device to transmit the first packet directly at the first underlying bearer next time based on the reflective mapping mechanism, the startup identifier of the first value is carried in the second data packet that currently needs to be transmitted to the second communication device. When the startup identifier is of the first value, the second communication device is instructed to start the reflective mapping transmission mechanism. In this way, after the second communication device receives the startup identifier of the first value, the second communication device starts the reflective mapping transmission mechanism, and transmits the first data packet based on the reflective mapping. This ensures that the first communication device subsequently receives data packets transmitted from the second communication device at the first underlying bearer.

In this embodiment, the startup identifier may be one or more bits, and the value of the startup identifier may at least include a first value and a second value. The first value is different from the second value. For example, when the startup identifier is 1 bit, if the first value is "0", then the second value is "1"; if the first value is "1", then the second value is "0".

The second data packet may be a data packet that is originally provided with a startup identifier bit or a startup identification field, or may be a data packet that is not originally provided with a startup identifier bit or a startup identification field. The second data packet herein is an associated data packet of the startup identifier of the first value.

When the second data packet is a data packet that is originally provided with a startup identification field, the startup identifier of the first value may be directly written into the startup identification field in the step S110. In this way, after the second communication device receives the second data packet, the second communication device may obtain the startup identifier of the first value by decoding the startup identification field according to a communication protocol or a pre-negotiation.

When the second data packet is a data packet that is not originally provided with a startup identification field, the startup identification field needs to be added at a predetermined location of the second data packet. For example, the startup identification field may be added in the front of the second data packet, or, the startup identification field may be appended at the end of the second data packet. In this way, after the second communication device receives the second data packet, the second communication device may determine whether the startup identification field is currently carried in the second data packet according to a length of the second data packet thereby obtaining the startup identifier of the first value.

In this embodiment, the startup identification field at least includes: a startup identifier bit. The startup identifier bit is at least 1 bit.

In summary, if the first communication device needs to trigger the second communication device to transmit the first data packet based on the reflective mapping transmission mechanism, the startup identifier of the first value may be added to the second data packet that needs to be transmitted to the second communication device, thereby completing startup of the reflective mapping transmission mechanism in a simple manner. The second data packet that originally needs to be transmitted to the second communication device is used to carry the startup identifier, then there is no need to use a control signaling data packet to carry the startup identifier. Apparently, taking the second data packet as the associated data packet for transmission of the startup identifier, will generate a smaller amount of data as comparing with constructing a special data packet, thereby having the characteristics of low overhead and easy to implement with the second data packet.

In some embodiments, the second data packet may be a data packet which is originally to be transmitted at a second underlying bearer. In this embodiment, in order to notify the second communication device of a target underlying bearer corresponding to transmission of the first data packet based on reflective mapping, the second data packet which is originally to be transmitted through the second underlying bearer may be adjusted to be transmitted through the first underlying bearer. Since the second data packet carries the startup identifier of the first value, the second communication device starts the reflective mapping according to the startup identifier of the first value and transmits the first data packet through the first underlying bearer. In this way, if the second data packet is originally determined to be transmitted through the second underlying bearer, then, in the step S120, the second data packet carrying the startup identifier of the first value is adjusted to be transmitted through the first underlying bearer.

In other embodiments, if the second data packet is located at the first underlying bearer, the second data packet carrying the first value is directly transmitted through the first underlying bearer.

In some embodiments, the method further includes:

according to a current data transmission status between the first communication device and the second communication device, determining the second data packet to be added with the startup identifier of the first value.

For example, in some embodiments, the step of according to the current data transmission status between the first communication device and the second communication device, determining the second data packet to be added with the startup identifier of the first value, includes:

determining whether there is data transmission between the first communication device and the second communication device through the first underlying bearer; if yes, preferentially selecting a data packet transmitted through the first underlying bearer as the second packet.

For example, a data packet A, a data packet B and a data packet C are transmitted between a base station and a terminal through three different underlying bearers. In the three data packets, when the data packet C is transmitted through the first underlying bearer, the data packet C may be directly taken as the second data packet, which is added with the startup identifier of the first value and then is transmitted to the second communication device, thereby reducing underlying bearer switching during data packet transmission and reducing establishment of the underlying bearer.

In still another embodiment, the step of according to the current data transmission status between the first communication device and the second communication device, determining the second data packet to be added with the startup identifier of the first value, includes:

determining, transmission time delay of data packets, which are currently transmitted between the first communication device and the second communication device through different underlying bearers, transmitted to the second communication device; and selecting a data packet with the smallest transmission time delay as the second data packet.

For example, the data packet A, the data packet B, and the data packet C are transmitted between the base station and the terminal through three different underlying bearers. Based on transmission status such as resource scheduling, current transmission time delays of the data packet A, the data packet B, and the data packet C transmitted to the terminal are determined, respectively. For example, the transmission time delay of the data packet B to the terminal is the smallest, then the data packet B is directly taken as the second data packet carrying the startup identifier of the first value and the data packet B is transmitted through the first underlying bearer. At this point, if the data packet B is originally to be transmitted through the first underlying bearer, then the data packet B is transmitted through the first underlying bearer; if the data packet B is originally to be transmitted through the second underlying bearer, the data packet B is adjusted to be transmitted through the first underlying bearer. When the selection of the second data packet is based on the transmission time delay, the second communication device can be notified of transmitting the first data packet in the reflective mapping transmission mechanism as early as possible, thereby reducing transmission time delay of transmission of the first data packet through the the corresponding underlying bearer.

In some embodiments, when the second data packet is originally to be transmitted through the second underlying bearer, if it is determined that the reflective mapping transmission mechanism is successfully started in the second communication device, that is, the first data packet is received at the first underlying bearer, then the method may further include: switching the second data packet to utilize the second underlying bearer for transmission.

In general, different underlying bearers provide different QoS attributes, while different data require different QoS attributes. However, generally, the higher the QoS attribute, the higher the transmission reliability and the transmission quality, and the higher communication resources and/or transmission time delays that may be consumed. In this embodiment, when performing underlying bearer switching for the second data packet, in order to ensure that the QoS attribute for the second data packet is satisfied by itself, the QoS attribute corresponding to the second underlying bearer which is originally used by the selected second data packet is required to be not higher than the QoS attribute corresponding to the first underlying bearer, otherwise the transmission of the second data packet itself may not satisfy the required QoS attribute.

When there is no data packet is transmitted through the first underlying bearer between the first communication device and the second communication device, optionally, the method further includes:

after transmitting the second data packet by the first underlying bearer and receiving the first data packet through the first underlying bearer, adding the startup identifier of a second value into a to-be-transmitted second data packet;

transmitting the second data packet carrying the startup identifier of the second value through the first underlying bearer.

When the first data packet received by the first communication device has been switched to the first underlying bearer for transmission, it indicates that the reflective mapping is successfully started in the second communication device, and then the startup identifier may be set to the second value. In this way, it can avoid the second communication device from continuing to receive the corresponding startup identifier for indicating startup after the second communication device receives the startup identifier and starts the reflective mapping transmission mechanism, thereby reducing problems of logical processing confusion inside the second communication device and ensuring normal operation of the second communication device.

In still other embodiments, the method further includes:

after transmitting the second data packet through the first underlying bearer and before receiving the first data packet through the first low layer bearer, continuing to transmit the second data packet carrying the startup identifier of the first value through the first underlying bearer.

In the process of wireless transmission, packet loss or decoding errors may occur. When the second communication device does not successfully receive the second data packet carrying the startup identifier of the first value, or does not correctly decode the startup identifier of the first value from the second data packet, the second communication device may continue transmitting the first data packet to the first communication device by a third underlying bearer. While in this embodiment, in order to successfully trigger the second communication device to start the reflective mapping transmission mechanism, the second data packet carrying the startup identifier of the first value is continued to be transmitted through the first underlying bearer. It is worth noting that the transmitted second data packet here may be an initial data packet or a retransmission data packet. For example, there are 10 second data packets between the first communication device and the second communication device; the second one of the second data packets starts to carry the startup identifier of the first value, and the first communication device sequentially transmits the second data packets by the first underlying bearer in turns of the second data packets. When the fifth one of the second data packets is transmitted, the first data packet received by the first communication device is still received from the third underlying bearer, then the sixth one of the second data packets transmitted from the first communication device to the second communication device still carries the startup identifier of the first value. When the first data packet received by the first communication device has been switched from the third underlying bearer to the first underlying bearer, or the first data packet with no underlying bearer being originally determined has been transmitted by the first underlying bearer to the first communication device, the startup identifier carried in the sixth one of the second data packets transmitted from the first communication device to the second communication device is set to be the second value.

In summary, in this embodiment, one or more second data packets carrying the startup identifier of the first value are used to trigger the second communication device to start the reflective mapping; meanwhile, after the reflective mapping is started successfully, the startup identifier carried in the second data packet is set to be the second value.

In some embodiments, when the reflective mapping in the second communication device is successfully started, the second data packet no longer carries the startup identifier, which may reduce unnecessary transmission of the startup identifier, and reduce signaling overhead and amount of transmitted data.

Optionally, the method further includes:

when it is determined that the first data packet needs to be transmitted at the first underlying bearer, adding in the second data packet, identification information of the first data packet that needs to be transmitted at the first underlying bearer; where the identification information is used by the second communication terminal to determine a data packet for performing reflective mapping transmission.

For example, the identification information may be a flow identifier of a data flow to which the first data packet belongs, or may be a service identifier of a service corresponding to the first data packet. In summary, the identification information may be identification information for the second communication device to determine a data packet which needs to be transmitted at the first underlying bearer.

The foregoing startup identification field may include: a startup identifier bit of at least one bit. In this embodiment, the startup identification field further includes an identification sub-field of a plurality of bits. The identification sub-field may be used to carry the identification information.

Figure 2:
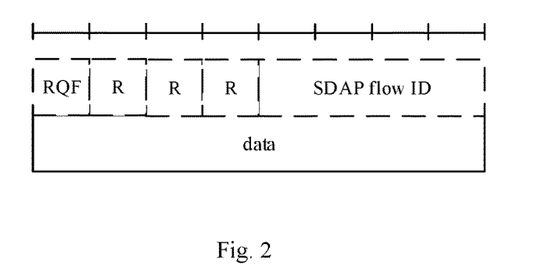
FIG. 2 is a schematic diagram of a startup identification field according to an embodiment of the present disclosure.

FIG. 2 is a schematic diagram of a startup identification field. The startup identification field shown in FIG. 2 includes 8 bits, including: a startup identifier bit (RQF) of one bit and an identification sub-field of 4 bits. The identification sub-field carries a SDAP-based flow identifier. The "R" in FIG. 2 represents a reserved bit in the startup identification field, and the reserved bit may be used for subsequent various indications related to starting the reflective mapping. For example, the reserved bit may be used to indicate a starting data packet in a corresponding data flow for performing the reflective mapping. One data flow includes a plurality of data packets. The first communication device such as a base station may determine which data packet in the data flow to start transmission with the reflective mapping.

Of course, FIG. 2 is only an optional schematic diagram of the startup identification field. In actual implementation, the startup identification field is not limited to the structure of shown in FIG. 2.

The step S110 may include:

carrying the startup identifier of the first value in a packet header of the second data packet.

In this embodiment, the data packet transmitted based on the SDAP may not have a packet header. In this embodiment, the second data packet may be a data packet that includes a packet header and a body portion. In this embodiment, the startup identifier of the first value may be carried in the packet header of the second data packet. The packet header of the second data packet here may be a special packet header for carrying the startup identifier of the first value.

In some embodiments, the method further includes:

determining whether the quality of service (QoS) attribute of the first data packet changes; where the first underlying bearer is an underlying bearer having a target QoS attribute after the QoS attribute of the first data packet changes.

For example, the first data packet is originally defined to be transmitted at the third underlying bearer. During data transmission, when the first communication device founds change of the QoS attribute of the first data packet that needs to be switched, the first communication device needs to change the underlying bearer for transmission.

For example, when the first communication device is a base station, the determining step may include one or more of the following optional modes.

Optional mode one:

the determining step may include:

when types of data packets transmitted at the third underlying bearer or the number of data packets transmitted at the third underlying bearer is excessive, performing load balancing between different underlying bearers; where performing load balancing includes changing the QoS attribute of the corresponding data packet. When the QoS attribute is changed, the corresponding data packet needs to be carried by the first underlying bearer with the changed QoS attribute.

Optional mode two:

the determining step may include:

receiving, at the base station, from an upstream device such as a core network element or a gateway, an instruction for switching the QoS attribute of the first data packet. For example, the mobility management entity indicates to the base station that the QoS attribute of the first data packet has changed, or provides the changed QoS attribute of the first data packet.

Optional mode three:

the determining step may include:

when the first communication device communicates with the second communication device, determining whether QoS attribute of service data carried in the first data packet. For example, QoS attributes of different service data of an application A are different, although first data packets are service data of the application A, the first data packets are different types of service data, then, the first communication device may determine whether the QoS attribute is changed according to service data in the currently received first data packet.

Optional mode four:

the determining step may include:

after the first communication device transmits service data to the second communication device, returning, by the second communication device, a control instruction or corresponding service data to the first communication device according to reception status of the service data, with the QoS attribute of the control instruction being higher than the QoS attribute of the corresponding service data. For example, the first communication device is a base station and the second communication device is a terminal. The base station transmits downlink data to the terminal. According to reception status of the downlink data, the terminal needs to return to the base station an acknowledge character (ACK) for indicating successful reception or a non-acknowledge character (NACK) for indicating unsuccessful reception.

In some embodiments, the method further includes:

determining whether the first underlying bearer is established;

when the first underlying bearer is not established and the first communication device is a base station, instructing establishment of the first underlying bearer by RRC signaling, RLC signaling, or MAC signaling; or, when the first underlying bearer is not established and the first communication device is a terminal, requesting for establishing the first underlying bearer by uplink control information.

When the first communication device is a base station, the base station may establish the first underlying bearer by using various signaling of the related art. For example, the base station may use RRC signaling, MAC layer signaling to instruct the terminal to participate in the establishment of the first underlying bearer. This is convenient for transmission of the second data packet carrying the start identifier of the first value by the first underlying bearer after the first underlying bearer is established.

When the current first communication device is a terminal, the uplink control information requests for establishing the first underlying bearer with the base station. After receiving the uplink control information carrying establishment of the first underlying bearer, the base station establishes the first underlying bearer when conditions for establishing the first underlying bearer are met.

Figure 3:
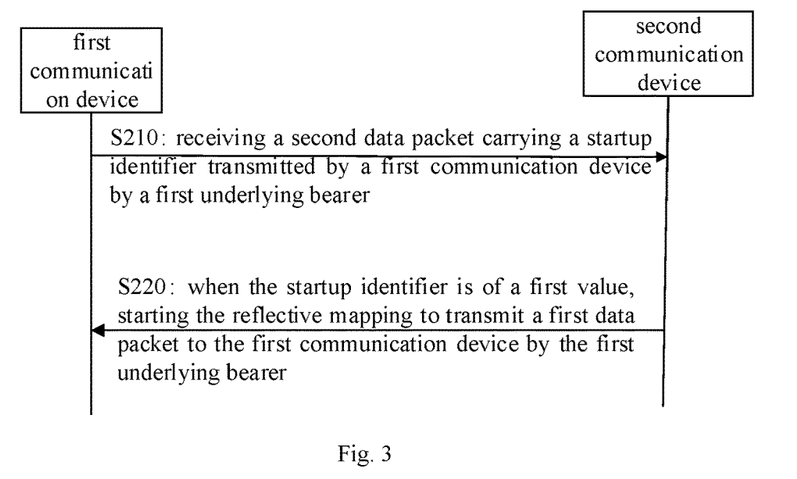
FIG. 3 is a schematic flowchart of a method for starting a reflective mapping according to a second embodiment of the present disclosure.

As shown in FIG. 3, an embodiment provides a method for starting a reflective mapping, which is applied to a second communication device, and including:

Step S210: receiving a second data packet carrying a startup identifier transmitted by a first communication device by a first underlying bearer;

Step S220: when the startup identifier is of a first value, starting the reflective mapping to transmit a first data packet to the first communication device by the first underlying bearer.

In the embodiment, when the second communication device is a terminal, the first communication device may be a base station; and when the second communication device is a base station, the first communication device is a terminal.

In this embodiment, the second communication device may be a receiving end of the second data packet. In the step S210, the second communication device receives the second data packet carrying the startup identifier of the first value.

After receiving the second data packet carrying the startup identifier of the first value, the second communication device starts the reflective mapping transmission mechanism, and transmits the first data packet by the first underlying bearer which transmits the second data packet.

The first communication device uses the second data packet, which originally needs to be transmitted to the second communication device, to carry the startup identifier of the first value. Thus, only a small signaling overhead and as few data packets as possible can complete transmission of the startup identifier and startup of the reflective mapping transmission mechanism in the second communication device can be started in a simple manner.

Optionally, the method further includes:

when the first data packet further carries identification information;

the step S220 may include: when the startup identifier is of a first value, starting a reflective mapping to transmit the first data packet corresponding to the identification information by the first underlying bearer.

In the embodiment, the second data packet further carries identification information of the first data packet. The identification information herein may be an indication identifier which uniquely determines the first data packet, such as a service identifier of the first data packet and/or a flow identifier of data flow.

In this way, through the identification information, the second communication device can learn that the currently started reflective mapping is applied to which type of data packet, that is, the second communication device can determine the first data packet transmitted by the first underlying bearer.

In some embodiments, the step S220 may include: switching the first data packet which is originally determined to be transmitted by a third underlying bearer to be transmitted by the first underlying bearer.

Figure 4:
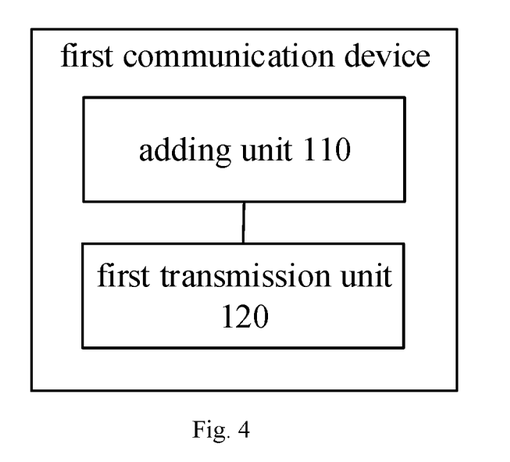
FIG. 4 is a schematic diagram of a first communication device according to an embodiment of the present disclosure.

As shown in FIG. 4, an embodiment provides a communication device. The communication device is a first communication device, and includes:

an adding unit 110 used to, when it is determined that first data packet needs to be transmitted at a first underlying bearer, add a startup identifier of a first value to a second data packet; where the startup identifier of the first value is used to instruct the second communication device to start reflective mapping, the first data packet is a data packet transmitted by a second communication device to the first communication device, and the second data packet is a data packet that originally needs to be transmitted;

a first transmission unit 120 used to transmit the second data packet carrying the startup identifier of the first value by the first underlying bearer.

The communication device provided in this embodiment is a transmission device of the second data packet and a receiving device of the first data packet.

In this embodiment, the first communication device may be a base station or a terminal, and the second communication device may be a terminal or a base station.

In the embodiment, the adding unit 110 may correspond to a processor. The processor may be a central processing unit, a microprocessor, a digital signal processor, an application processor, a programmable array or an application specific integrated circuit or the like. The processor may add the startup identifier of the first value to the second data packet that is originally needed to be transmitted to the second communication device by executing executable instructions such as a computer program.

The first transmission unit 120 may be corresponding to transmission antenna of the first communication device, and may be used to transmit the second data packet carrying the startup identifier of the first value to the second communication device, thereby triggering the second communication device to transmit the first data packet to the first communication device after the second communication device receives the second data packet from the first underlying bearer.

Optionally, the adding unit 110 is further used to, after transmitting the second data packet by the first underlying bearer and receiving the first data packet through the first underlying bearer, add the startup identifier of a second value into a to-be-transmitted second data packet, and transmit the second data packet carrying the startup identifier of the second value through the first underlying bearer.

Optionally, the adding unit 110 is further used to, after transmitting the second data packet by the first underlying bearer and receiving the first data packet through the first underlying bearer, transmit second data packets not carrying the startup identifier.

Optionally, the adding unit 110 is further used to, after transmitting the second data packet through the first underlying bearer and before receiving the first data packet through the first low layer bearer, continue to transmit the second data packet carrying the startup identifier of the first value through the first underlying bearer.

Optionally, the adding unit 110 is further used to, when it is determined that the first data packet needs to be transmitted at the first underlying bearer, add in the second data packet, identification information of the first data packet that needs to be transmitted at the first underlying bearer; where the identification information is used by the second communication terminal to determine a data packet for performing reflective mapping transmission.

Optionally, the adding unit 110 is further used to carry the startup identifier of the first value in a packet header of the second data packet.

In some embodiments, the first communication device further includes:

a determining unit used to determine whether the quality of service (QoS) attribute of the first data packet changes; where the first underlying bearer is an underlying bearer having a target QoS attribute after the QoS attribute of the first data packet changes.

The determining unit may also correspond to the processor, and may determine whether the QoS attribute of the first data packet which is originally determined to be transmitted at the third underlying bearer is changed. If yes, it is required to start the reflective mapping transmission mechanism for the first underlying bearer.

The determining unit is specifically used to determine whether the first underlying bearer is established. The first communication device may further include:

an establishment unit corresponding to the processor and used to instruct establishment of the first underlying bearer by RRC signaling, RLC signaling, or MAC signaling when the first underlying bearer is not established and the first communication device is a base station; or, request for establishing the first underlying bearer by uplink control information when the first underlying bearer is not established and the first communication device is a terminal.

Further, the first transmission unit 120 may be used to switch the second data packet which is originally determined to be transmitted by the second underlying bearer to be transmitted by the first underlying bearer.

Figure 5:
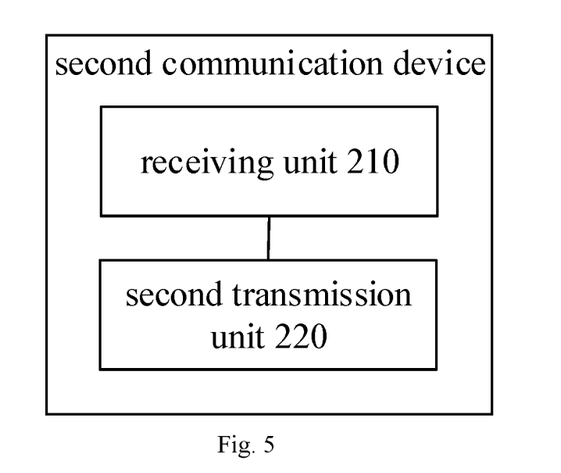
FIG. 5 is a schematic diagram of a second communication device according to an embodiment of the present disclosure.

As shown in FIG. 5, an embodiment provides a communication device. The communication device is a second communication device, and includes:

a receiving unit 210 used to receive a second data packet carrying a startup identifier transmitted by a first communication device by a first underlying bearer;

a second transmission unit 220 used to, when the startup identifier is of a first value, start the reflective mapping to transmit a first data packet to the first communication device by the first underlying bearer.

When the second communication device in this embodiment is a terminal, the first communication device may be a base station.

In this embodiment, the receiving unit 210 and the second transmission unit 220 each may correspond to a transceiver antenna, and may be used for transmitting wireless signals with the first communication device, thereby implementing startup of the reflective mapping and transmission of the second data packet and the first data packet.

Optionally, the first data packet further carries identification information.

The second transmission unit 220 is used to, when the startup identifier is of a first value, start a reflective mapping to transmit the first data packet corresponding to the identification information by the first underlying bearer.

In the embodiment, the second transmission unit 220 is specifically used to switch the first data packet which is originally determined to be transmitted by a third underlying bearer to be transmitted by the first underlying bearer.

Figure 6:
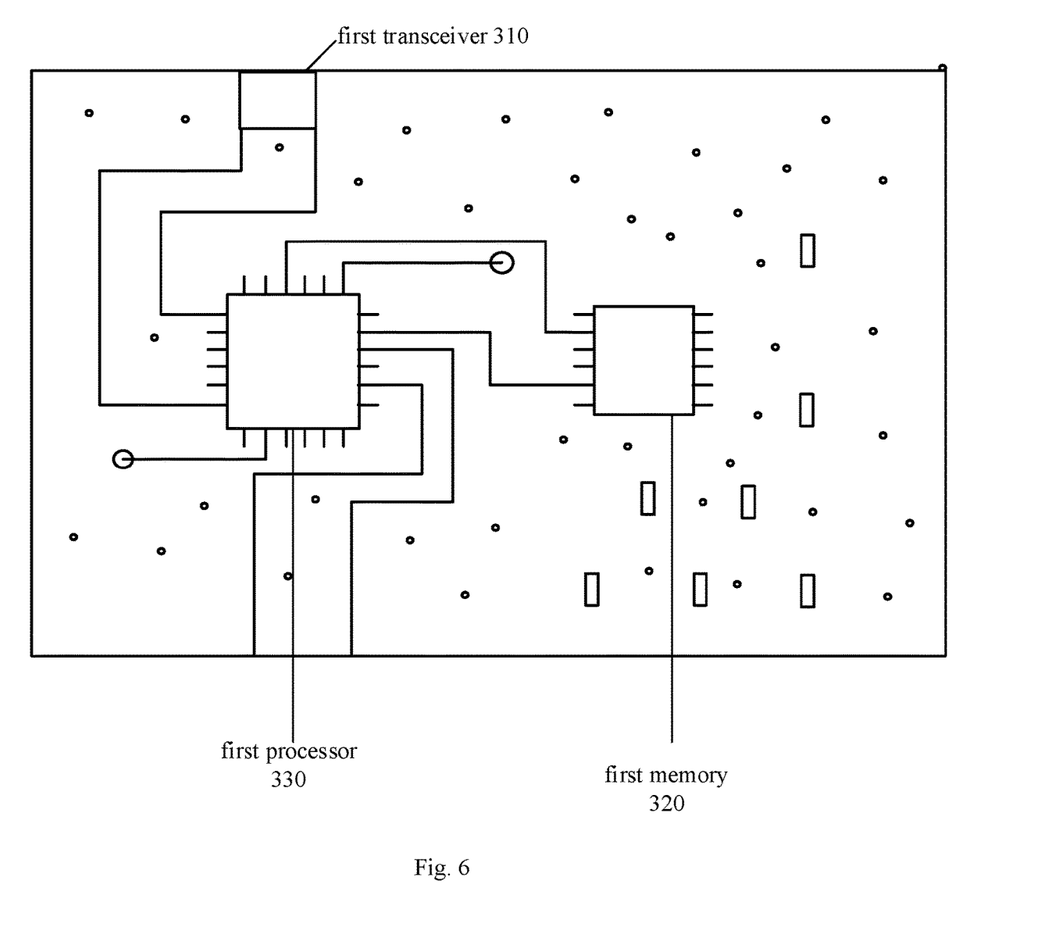
FIG. 6 is a schematic structural diagram of another first communication device according to an embodiment of the present disclosure.

As shown in FIG. 6, an embodiment provides a communication device. The communication device is a first communication device and includes a first transceiver 310, a first memory 320 and a first processor 330.

The first processor 330 is coupled to the first transceiver 310 and the first memory 320, respectively, and is used to execute a computer program to perform at least the following steps:

when it is determined that first data packet needs to be transmitted in a first data radio bearer underlying bearer, adding a startup identifier of a first value to a second data packet; where the startup identifier of the first value is used to instruct the second communication device to start reflective mapping, the first data packet is a data packet transmitted by a second communication device to the first communication device, and the second data packet is a data packet that is originally to be transmitted by the first communication device;

transmitting, through the first underlying bearer, the second data packet carrying the startup identifier of the first value.

The first transceiver 310 in this embodiment may correspond to a transceiver antenna.

The first memory 320 may include various types of storage media that can be used for data storage. In this embodiment, at least some of the storage medium included in the first memory 320 is a non-volatile storage medium, and can be used to store the computer program.

The first processor 330 may include a central processing unit, a microprocessor, a digital signal processor, an application processor, an application specific integrated circuit or a programmable array, etc., and may be used to implement PNF packet formation by execution of a computer program.

In this embodiment, the first processor 330 may be coupled to the first transceiver 310 and the first memory 320 through an in-device bus such as an integrated circuit bus. The first processor 330 can be used to control the first transceiver 310 to transmit and receive data, and to control the first memory 320 to store data, and to implement the above operations by execution of executable instructions such as a computer program.

For example, the steps that the first processor 330 may perform further include:

after transmitting the second data packet by the first underlying bearer and receiving the first data packet through the first underlying bearer, adding the startup identifier of a second value into a to-be-transmitted second data packet, and transmit the second data packet carrying the startup identifier of the second value through the first underlying bearer; or, after transmitting the second data packet by the first underlying bearer and receiving the first data packet through the first underlying bearer, transmit second data packets not carrying the startup identifier.

In some embodiments, the first processor 330 may also be used to perform the following steps:

after transmitting the second data packet through the first underlying bearer and before receiving the first data packet through the first low layer bearer, continuing to transmit the second data packet carrying the startup identifier of the first value through the first underlying bearer.

In other embodiments, the first processor 330 may also be used to perform the following steps:

when it is determined that the first data packet needs to be transmitted at the first underlying bearer, adding in the second data packet, identification information of the first data packet that needs to be transmitted at the first underlying bearer; where the identification information is used by the second communication terminal to determine a data packet for performing reflective mapping transmission.

In addition, the first processor 330 is specifically used to carry the startup identifier of the first value in a packet header of the second data packet.

In addition, the first processor 330 is further used to perform the following steps:

determining whether the quality of service (QoS) attribute of the first data packet changes; where the first underlying bearer is an underlying bearer having a target QoS attribute after the QoS attribute of the first data packet changes.

When the determining operation is performed, the first processor 330 may be specifically used to determine whether the first underlying bearer is established; instruct establishment of the first underlying bearer by RRC signaling, RLC signaling, or MAC signaling when the first underlying bearer is not established and the first communication device is a base station; or, request for establishing the first underlying bearer by uplink control information when the first underlying bearer is not established and the first communication device is a terminal.

The first transceiver 310 is used to, under the control of the first processor 330, switch the second data packet which is originally determined to be transmitted by the second underlying bearer to be transmitted by the first underlying bearer.

Figure 7:
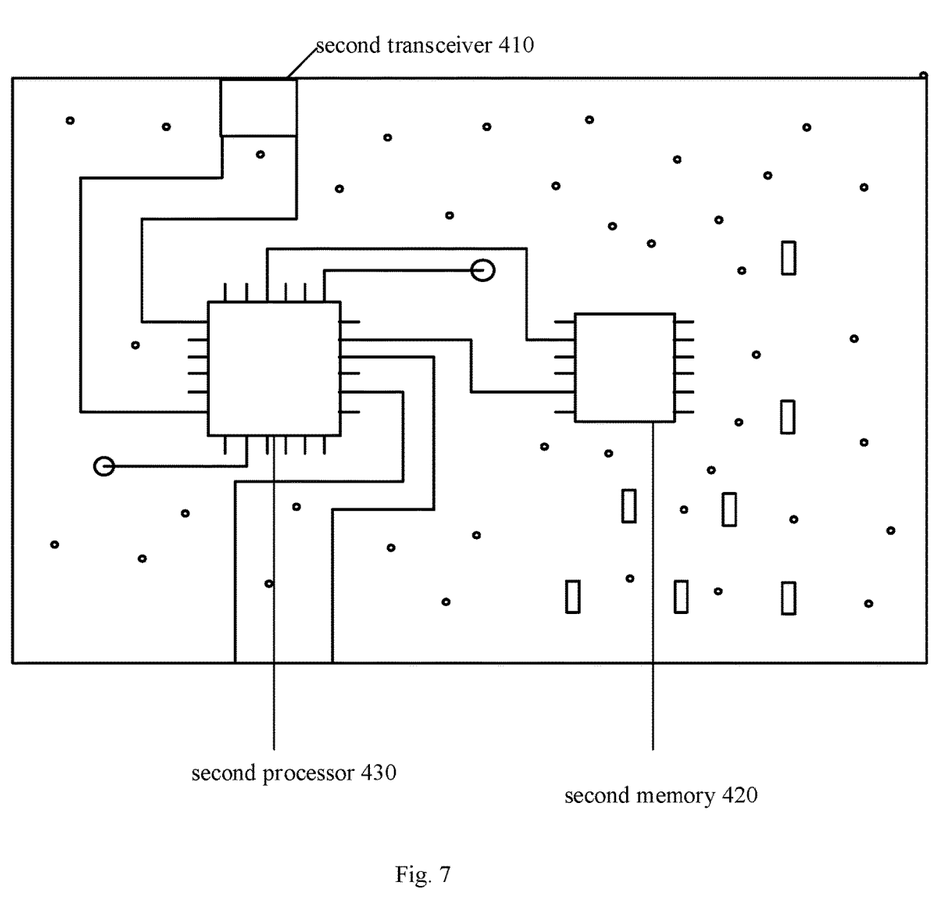
FIG. 7 is a schematic structural diagram of another second communication device according to an embodiment of the present disclosure.

As shown in FIG. 7, an embodiment provides a communication device. The communication device is a second communication device and includes: a second transceiver 410, a second memory 420 and a second processor 430.

The second processor 430 is coupled to the second transceiver 410 and the second memory 420, respectively, and is used to execute a computer program to perform at least the following steps:

receiving a second data packet carrying a startup identifier transmitted by a first communication device by a first underlying bearer;

when the startup identifier is of a first value, starting the reflective mapping to transmit a first data packet to the first communication device by the first underlying bearer.

The second transceiver 410 in this embodiment may correspond to a transceiver antenna.

The second memory 420 may include various types of storage media that can be used for data storage. In this embodiment, at least some of the storage medium included in the second memory 420 is a non-volatile storage medium, and can be used to store the computer program.

The second processor 430 may include: a central processing unit, a microprocessor, a digital signal processor, an application processor, an application specific integrated circuit or a programmable array, etc., and may be used to implement PNF packet formation by execution of a computer program.

In this embodiment, the second processor 430 may be coupled to the second transceiver 410 and the second memory 420 through an in-device bus such as an integrated circuit bus.

Optionally, the first data packet further carries identification information.

The second processor 430 is specifically used to perform the following steps: when the startup identifier is of a first value, starting a reflective mapping to transmit the first data packet corresponding to the identification information by the first underlying bearer.

Optionally, the second processor 430 is specifically used to switch the first data packet which is originally determined to be transmitted by a third underlying bearer to be transmitted by the first underlying bearer.

An embodiment of the present disclosure further provides a communication device, including: a third transceiver, a third memory, a third processor, and a computer program stored on the third memory and processed by the third processor. The third processor is respectively coupled to the third transceiver and the third memory, and is used to execute the computer program to control the transceiver to exchange information, control the memory to store information, perform the foregoing one or more methods for starting reflective mapping applied to the first communication device or the second communication device.

In the embodiment, the third transceiver may correspond to a transceiver antenna of the first communication device or the second communication device.

The third memory may include various types of storage media that may be used for data storage. In this embodiment, at least some of storage medium included in the second memory is a non-volatile storage medium and can be used to store the computer program.

The third processor may include a central processing unit, a microprocessor, a digital signal processor, an application processor, an application specific integrated circuit or a programmable array, etc., and may be used to implement PNF packet formation by execution of a computer program.

In this embodiment, the third processor may be coupled to the third transceiver and the third memory through an in-device bus such as an integrated circuit bus.

An embodiment of the present disclosure further provide a computer storage medium storing a computer program. The computer program is executed by a processor to perform the foregoing one or more methods for starting reflective mapping applied to the first communication device or the second communication device.

The computer storage medium provided by the embodiment of the present disclosure includes: a mobile storage device, a read-only memory (ROM), a random access memory (RAM), a magnetic disk, or an optical disk, or a medium which can store program codes. Optionally, the computer storage medium may be a non-transitory storage medium. The non-transitory storage medium herein may also be referred to as a non-volatile storage medium.

Several examples are provided hereinafter in conjunction with the above embodiments. In the following examples, DRB is taken as an example of the underlying bearer, which is not limited to DRB.

EXAMPLE 1

Figure 8:
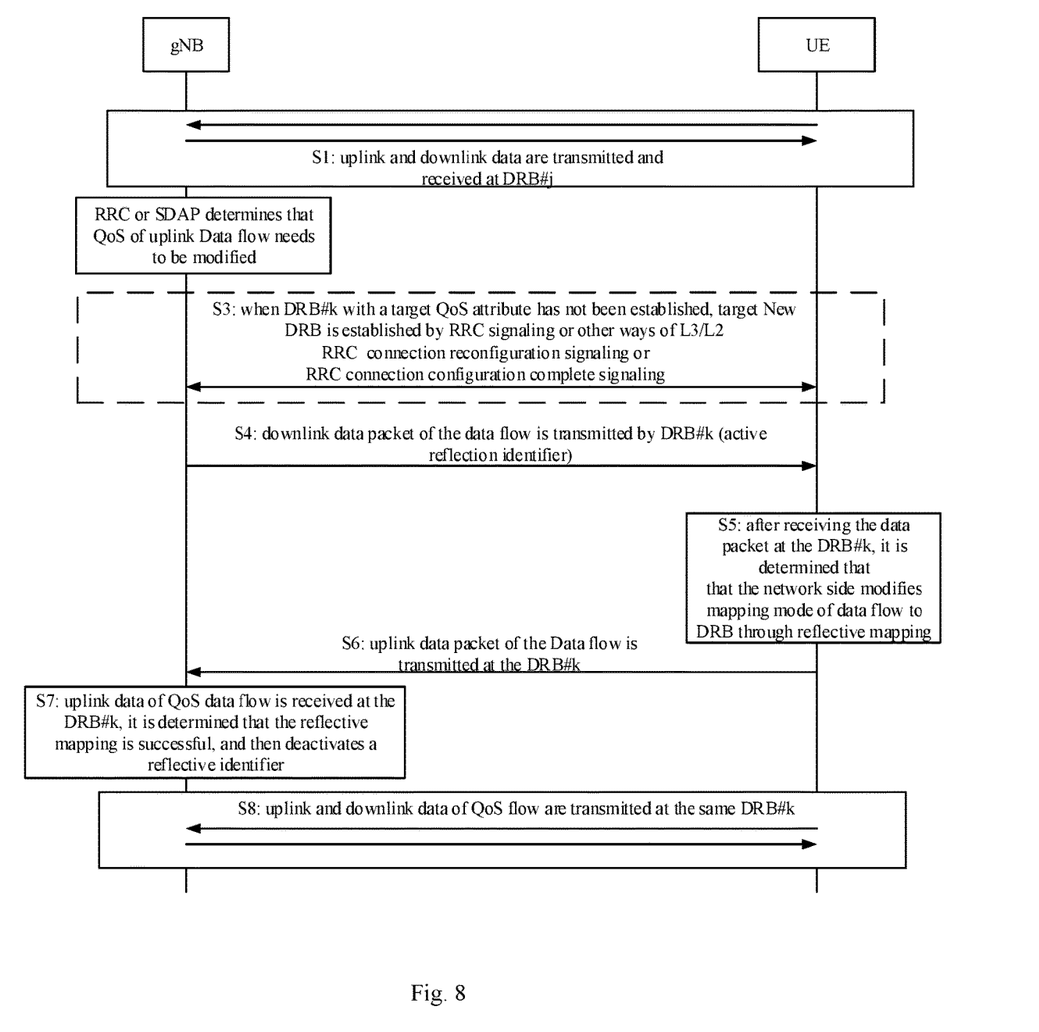
FIG. 8 is a schematic flowchart of a method for starting a reflective mapping based on an associated data packet in SDAP according to an embodiment of the present disclosure.

As shown in FIG. 8, this example provides a method for starting a reflective mapping based on an associated data packet in SDAP, including the following steps.

At step S1, uplink and downlink data of QoS data flow (Flow #i) of a network side base station (gNB) and a terminal are transmitted and received at the DRB #j.

At step S2, an RRC or SDAP function entity on the network side determines that the QoS level of the uplink Flow #i of the terminal needs to be modified.

At step S3, when DRB #k with a target QoS attribute has not been established, the target DRB is established by RRC connection reconfiguration signaling or other fast ways of L3/L2.

At step S4, the SDAP entity or the base station transmits the downlink data packet of the Flow #i at the DRB #k with an active reflection identifier being carried, and stops transmitting any downlink data packet of the Flow #i at the DRB #j. The active reflection identifier herein is the above startup identifier of the first value.

At step S5, after receiving the data packet of Flow #i at the DRB #k, the SDAP entity of the terminal determines whether the network side instructs to start the reflective mapping.

At step S6, the SDAP entity of the terminal transmits the uplink data packet of the subsequent Flow #i at the DRB #k, and stops transmitting at the DRB #j.

At step S7, the SDAP of the network side receives the uplink data of the Flow #i at the DRB #k, and then determines that the reflective mapping is successful, and then deactivates a reflective identifier.

At step S8, uplink and downlink data of Flow #i are simultaneously transmitted at DRB #k.

EXAMPLE 2

This example provides a method of activating and deactivating an associated reflective identifier, including the following steps.

A channel associated instruction including a reflection identifier is introduced in a header of a protocol data unit (PDU) of the SDAP, and is recorded as Reflective Flow Flag (RQF). Herein, one protocol data unit may be considered as a data packet. The header of the PDU may be the header of a data packet.

The value of RQF is:
  0: other meanings;
  ...
  i: reflective mapping is not started;
  j: reflective mapping is started;
  ...
  n: other meanings.

The RQF may be an identifier with multiple meanings, and the reflective mapping is only two values of them. The RQF may also be an identifier for reflective mapping only, and in this case, the RQF can occupy only 1 bit, as follows:
  the value of RQF is:
  0: reflective mapping is not started;
  1: reflective mapping is started.

Relationship between RQF and Flow ID (for convenience of explanation, 1-bit RQF value is adopted) is as follows:
  when the RQF=0, whether the flow ID needs to be carried in the SDAP PDU header is not defined in the present disclosure; the flow ID may or may not be carried, but the reflective mapping operation is not performed on the Flow;
  when RQF=1, the Flow ID needs to be carried to indicate the Flow for performing the reflective mapping operation.

Only when the network side starts the reflective mapping, the RQF is set to 1. In order to ensure that the channel associated configuration information can be received by the peer end, the network side needs to always transmit PDU with RQF=1 until data packet of uplink flow specified by the terminal is received. That is, confirming that the reflective mapping operation is successful, RQF is set to 0 in the subsequent PDU until the next time the reflective mapping operation needs to be activated.

Each time the terminal side receives a SDAP PDU, the terminal parses the head of the SDAP PDU and reads the RQF from the header. When the RQF is 1, it indicates that the network side starts the reflective mapping. According to the requirements defined in the reflective mapping, it may be necessary to read the Flow ID in the PDU header, and then uplink data on the Flow indicated by the Flow ID it transmitted at the DRB. After receiving the first SDAP PDU with RQF=1, the terminal further receives several ones consecutively. When the several ones and the first received Flow PDU are transmitted by the same DRB, it is considered that the reflective mapping has been started, and RQF may be ignored. Alternatively, a reflective mapping operation may be performed once every time RQF=1 is received, which does not affect the actual effect, because the uplink Flow packet has been transmitted at the DRB after the first reception.

When the RQF received by the terminal is 0, regardless of whether there is a Flow ID, no reflective mapping operation is performed on the Flow indicated by the ID.

FIG. 2 shows an example of a SDAP PDU scheme in which a PDU header carries RQF of 1-bit in length and a SDAP Flow ID of no more than 7 bits in length.

FIG. 2 is a schematic diagram of location scheme of RQF and SDAP Flow ID in a PDU.

a) the length of the SDAP Flow ID is n bits, and the value of n is not defined in this example, and may be a reserved bit.

b) the length of the RQF is m bits, and the value of m is not defined in the disclosure, and may be reserved bits and may be determined according to the subsequent definition of the 3GPP. No matter the value of m, there are two values: one represents that the reflective mapping is not started, and one represents that the reflective mapping is started.

In the embodiments of the application, it should be understood that, the disclosed devices and methods may be implemented with other methods. For example, the above-described device embodiments are only illustrative, e.g., the division of the unit is only a logic function division. In practical implementation, there may be another division method. For example, multiple units or components may be combined, or integrated into another system, or some features may be omitted, or not executed. From another point, the mutual coupling or direct coupling, or communication connection shown or discussed may be indirect coupling, or communication connections through some interfaces, devices, or units, which may be electronic, mechanical, or in other form.

Units described as separate components may be, or may be not physically separate. A component displayed as a unit may be, or may be not a physical unit, that is, it may be located in one place, or may be distributed to multiple network units. According to practical requirements, some units or all the units may be selected to implement the objective of solutions in the embodiments of the application.

In addition, in each embodiment of the present disclosure, various functional units may be integrated into a processing unit. Alternatively, each unit physically exists alone. Still alternatively, two or more units may be integrated into one unit. The integrated unit may be implemented in the form of hardware or in the form of hardware plus software functional units.

A person skilled in the art can understand that all or part of the steps for implementing the above method embodiments may be completed by using program to instruct related hardware. The foregoing program may be stored in a computer readable storage medium, and the program is executed to perform the steps of the above method embodiments. The foregoing storage medium includes: a mobile storage device, a read-only memory (ROM), a random access memory (RAM), a magnetic disk, or an optical disk, or a medium that can store program codes.

The foregoing are only optional embodiments of the present disclosure, but the scope of the present disclosure is not limited thereto. Those skilled in the art may make several improvements and modifications without departing from the principles of the present disclosure, which are also covered by this disclosure. Therefore, the scope of protection of the present disclosure should be determined by the scope of the claims.

What is claimed is:

1. A method for starting a reflective mapping, applied to a first communication device, comprising:
    when determining that a first data packet is to be transmitted by a first underlying bearer, adding a startup identifier of a first value to a second data packet; wherein the startup identifier of the first value is used to instruct a second communication device to start reflective mapping, the first data packet is a data packet transmitted by the second communication device to the first communication device, and the second data packet is a data packet that is originally to be transmitted by the first communication device; and
    transmitting the second data packet carrying the startup identifier of the first value by the first underlying bearer;
    wherein the method further includes:
    after transmitting the second data packet by the first underlying bearer and before receiving the first data packet through the first low layer bearer, continuing to transmit the second data packet carrying the startup identifier of the first value through the first underlying bearer.

2. The method of claim 1, further comprising:
    after transmitting the second data packet by the first underlying bearer and receiving the first data packet through the first underlying bearer, adding the startup identifier of a second value into a to-be-transmitted another second data packet; transmitting the another second data packet carrying the startup identifier of the second value by the first underlying bearer;
    or,
    after transmitting the second data packet by the first underlying bearer and receiving the first data packet through the first underlying bearer, transmitting another second data packet not carrying the startup identifier.

3. The method of claim 1, further comprising:
    when determining that the first data packet is to be transmitted by the first underlying bearer, adding in the second data packet, identification information of the first data packet that is to be transmitted by the first underlying bearer; wherein the identification information is used by the second communication terminal to determine a data packet for performing reflective mapping transmission.

4. The method of claim 1, wherein when determining that first data packet is to be transmitted by first underlying bearer, adding a startup identifier of a first value to a second data packet, comprises:
    carrying the startup identifier of the first value in a packet header of the second data packet.

5. The method of claim 1, wherein transmitting the second data packet carrying the startup identifier of the first value by the first underlying bearer, comprises:
    switching the second data packet which is originally determined to be transmitted by the second underlying bearer to be transmitted by the first underlying bearer.

6. A method for starting a reflective mapping, applied to a first communication device, comprising:
    when determining that a first data packet is to be transmitted by a first underlying bearer, adding a startup identifier of a first value to a second data packet;

wherein the startup identifier of the first value is used to instruct a second communication device to start reflective mapping, the first data packet is a data packet transmitted by the second communication device to the first communication device, and the second data packet is a data packet that is originally to be transmitted by the first communication device; and transmitting the second data packet carrying the startup identifier of the first value by the first underlying bearer;

wherein the method further comprises:

determining whether quality of service (QoS) attribute of the first data packet changes;

wherein the first underlying bearer is an underlying bearer having a target QoS attribute after the QoS attribute of the first data packet changes.

7. The method of claim 6, further comprising:

determining whether the first underlying bearer is established;

when the first underlying bearer is not established and the first communication device is a base station, instructing establishment of the first underlying bearer by RRC signaling, RLC signaling, or MAC signaling;

or, when the first underlying bearer is not established and the first communication device is a terminal, requesting for establishing the first underlying bearer by uplink control information.

8. A communication device, which is a first communication device, comprising: a first transceiver, a first memory and a first processor;

wherein the first processor is coupled to the first transceiver and the first memory, respectively, and is used to execute a computer program to perform at least the following steps:

when determining that first data packet is to be transmitted by a first underlying bearer, adding a startup identifier of a first value to a second data packet; wherein the startup identifier of the first value is used to instruct the second communication device to start reflective mapping, the first data packet is a data packet transmitted by a second communication device to the first communication device, and the second data packet is a data packet that is originally to be transmitted by the first communication device;

transmitting the second data packet carrying the startup identifier of the first value by the first underlying bearer;

wherein the first processor is further used to perform steps including:

after transmitting the second data packet by the first underlying bearer and before receiving the first data packet through the first low layer bearer, continuing to transmit the second data packet carrying the startup identifier of the first value through the first underlying bearer.

9. The communication device of claim 8, wherein the first processor is further used to perform steps including:

after transmitting the second data packet by the first underlying bearer and receiving the first data packet through the first underlying bearer, adding the startup identifier of a second value into a to-be-transmitted another second data packet; transmitting the another second data packet carrying the startup identifier of the second value by the first underlying bearer;

or, after transmitting the second data packet by the first underlying bearer and receiving the first data packet through the first underlying bearer, transmitting another second data packet not carrying the startup identifier.

10. The communication device of claim 8, wherein the first processor is further used to perform steps including:

when determining that the first data packet is to be transmitted by the first underlying bearer, adding in the second data packet, identification information of the first data packet that is to be transmitted by the first underlying bearer; wherein the identification information is used by the second communication terminal to determine a data packet for performing reflective mapping transmission.

11. A communication device, comprising: a third transceiver, a third memory, a third processor, and a computer program stored on the third memory and processed by the third processor;

wherein the third processor is respectively coupled to the third transceiver and the third memory, and is used to execute the computer program to control the transceiver to exchange information, control the third memory to store information, perform the method of claim 1.

12. A non-transitory computer storage medium comprising a computer program stored thereon; wherein the computer program is executed by a processor to perform the method of claim 1.

* * * * *